United States Patent
Stephan et al.

(10) Patent No.: US 11,359,748 B2
(45) Date of Patent: Jun. 14, 2022

(54) CONNECTION SYSTEM BETWEEN A DISTRIBUTION MEMBER AND A RECEIVING MEMBER AND LEAK DETECTION METHOD

(71) Applicant: SAFRAN POWER UNITS, Toulouse (FR)

(72) Inventors: Rémi Stephan, Moissy-Cramayel (FR); Matthieu Baron, Moissy-Cramayel (FR); Théophile Horde, Moissy-Cramayel (FR)

(73) Assignee: SAFRAN POWER UNITS, Toulouse (FR)

( * ) Notice: Subject to any disclaimer, the term of this patent is extended or adjusted under 35 U.S.C. 154(b) by 233 days.

(21) Appl. No.: 16/648,542

(22) PCT Filed: Sep. 21, 2018

(86) PCT No.: PCT/EP2018/075659
§ 371 (c)(1),
(2) Date: Mar. 18, 2020

(87) PCT Pub. No.: WO2019/057922
PCT Pub. Date: Mar. 28, 2019

(65) Prior Publication Data
US 2020/0217436 A1 Jul. 9, 2020

(30) Foreign Application Priority Data
Sep. 21, 2017 (FR) ...................... 1758733

(51) Int. Cl.
*F16L 21/02* (2006.01)
*G01M 3/28* (2006.01)

(52) U.S. Cl.
CPC .......... *F16L 21/02* (2013.01); *G01M 3/2853* (2013.01); *F16L 2201/30* (2013.01)

(58) Field of Classification Search
CPC ....... F16L 21/02; F16L 2201/30; F16L 41/08; G01M 3/2853
See application file for complete search history.

(56) References Cited

U.S. PATENT DOCUMENTS

2005/0046180 A1* 3/2005 Tombler, Jr. et al. . F16J 15/164
285/95
2010/0269956 A1 10/2010 Iida et al.

FOREIGN PATENT DOCUMENTS

EP 2505982 A2 10/2012

OTHER PUBLICATIONS

Search Report from French Intellectual Property Office on corresponding FR application (FR1758733) dated Jun. 4, 2018.
(Continued)

*Primary Examiner* — David Z Huang
(74) *Attorney, Agent, or Firm* — Klein, O'Neill & Singh, LLP

(57) ABSTRACT

A connection system comprising: a dispensing member; a receiving member; first sealing means and second sealing means arranged at the interface between the dispensing member and the receiving member to enable redundant leak-tight engagement between the dispensing member and the receiving member; a control chamber defined between the first sealing means and the second sealing means; and means for measuring the current pressure in the control chamber so as to detect a gas leak.

20 Claims, 3 Drawing Sheets

(56) References Cited

OTHER PUBLICATIONS

International Search Report and Written Opinion on corresponding PCT application (PCT/EP2018/075659) from International Searching Authority (EPO) dated Nov. 22, 2018.

* cited by examiner

CONNECTION SYSTEM BETWEEN A DISTRIBUTION MEMBER AND A RECEIVING MEMBER AND LEAK DETECTION METHOD

TECHNICAL FIELD

The present invention relates to the field of leak detection in a connection system between a gas distribution member and receiving member, in particular for the detection of a hydrogen leak in a fuel cell for an aeronautics application.

In a known manner, a fuel cell makes it possible to produce electrical energy from hydrogen and air. Hydrogen is a highly flammable and explosive gas. It is generally conditioned in a tank at high pressure and must be expanded before being used.

A fuel cell comprises hydrogen leak detection sensors which are suited to sealing the hydrogen tank in the event of a leak and making the assembly safe. When hydrogen is conditioned at high pressure, a considerable amount of hydrogen is capable of escaping in a very short time. Given the response time of detection sensors, the concentration of hydrogen in the ambient air can increase very quickly and form an explosive atmosphere before the detection sensors have been able to generate the least alarm. Within the context of use of an aeronautics fuel cell, that is to say on-board an aircraft, such drawbacks are not acceptable.

An immediate solution for eliminating these drawbacks would be to improve the response time of the detection sensors. However, no detection sensor currently meets the safety constraints for aeronautics use.

The aim of the invention is thus to overcome these drawbacks by proposing a novel connection system which makes it possible to detect a leak in a safe manner. Although the invention was originally conceived to resolve a problem relating to a hydrogen leak, it may apply to any type of gas.

SUMMARY

To this end, the invention relates to a connection system comprising:
- a distribution member fluidically connected to a first environment comprising a gas having a first pressure, the distribution member comprising first connection means, and
- a receiving member in contact with a second environment having a second pressure lower than the first pressure of the gas, the receiving member comprising second connection means mechanically engaging with the first connection means of the distribution member.

The invention is remarkable in that the system comprises:
- first sealing means and second sealing means arranged at the interface between the first connection means of the distribution member and the second connection means of the receiving member to enable redundant leak-tight engagement between the distribution member and the receiving member,
- a control chamber defined between the first sealing means and the second sealing means, the default pressure in the control chamber being lower than the second pressure of the second environment and
- means for measuring the current pressure in the control chamber so as to detect a gas leak.

Thanks to the invention, a fault of the first sealing means or the second sealing means is not problematic given that the leak-tightness is redundant. Leak-tightness is ensured by the first sealing means when the second sealing means are defective and vice versa. Apart from this protection which avoids the formation of an explosive atmosphere, the measurement of the current pressure in the control chamber makes it possible to detect a leak of the first sealing means or the second sealing means even if the latter is contained. Thus, a maintenance step may be carried out before the appearance of the least drawback in a preventive and reactive manner. The reliability of such a connection is enhanced, which improves safety. Moreover, the weight and the bulk of the connection system are only slightly affected.

Preferably, the second environment is the ambient environment at an ambient pressure.

Such a connection system is particularly suited to distributing a flammable gas such as hydrogen at high pressure.

Preferably, the connection system comprising monitoring means, the monitoring means are configured to generate a fault alarm when the current pressure of the control chamber is higher than the default pressure. Indeed, given that the default pressure in the control chamber is lower than the first pressure of the first environment and the second pressure of the second environment, any leak results in an increase in the pressure of the control chamber. By simple monitoring of the pressure of the control chamber, it is possible to detect a leak of the sealing means.

Further preferably, the connection system comprising monitoring means, the first sealing means being in contact with the first environment, the monitoring means are configured to generate a fault alarm of the first sealing means when the current pressure of the control chamber is higher than the second pressure. Indeed, the pressure of the control chamber gets closer to the pressure of the environment from where the leak has come. Such a connection system makes it possible not only to detect a leak but also makes it possible to determine the origin of the leak, which is very advantageous for carrying out maintenance operations.

The invention further relates to an assembly comprising a plurality of connection systems, such as described previously, each connection system comprising a control chamber, the control chambers being able to be fluidically connected together in order to form an overall control chamber. Advantageously, several control chambers may be shared together in order to limit the overall bulk of the assembly of connection systems, in particular, when said systems are close to one another and/or belong to a same item of equipment.

Preferably, the assembly only comprises one measuring device in the overall control chamber. Advantageously, a single measuring device may be shared between several connection systems, which limits the bulk and the overall cost.

The invention also relates to an assembly of a gas tank and a mechanical device connected to said gas tank by at least one connection system such as described previously. The use of a connection system with a gas tank for the mounting of a sensor or distribution head is particularly advantageous given that such a connection system limits the risk of a leak of a high-pressure gas capable of quickly forming an explosive atmosphere.

The invention also relates to a fuel cell comprising an assembly of a hydrogen tank and a mechanical device such as described previously and use of such a fuel cell in an aircraft. An application of the invention to a hydrogen fuel cell with a highly flammable gas at high pressure makes it possible to increase reliability and safety, which makes the use of a fuel cell compatible in the aeronautics field.

The invention further targets a method for detecting a leak in a connection system such as described previously, the method comprising:
- a step of measuring the current pressure of the control chamber, and
- a step of generating an alarm if the current pressure is higher than the default pressure.

As indicated previously, the simple measurement of a pressure difference makes it possible to detect a leak. Such a detection method is advantageous given that the leak is detected while being contained by redundant sealing means. Such a detection is preventive.

Preferably, the first sealing means being in contact with the first environment, the method comprises a step of generating a fault alarm of the first sealing means if the current pressure in the control chamber is higher than the second pressure of the second environment.

Further preferably, the second sealing means being in contact with the second environment, the method comprises a step of generating a leak alarm of the second sealing means if the current pressure in the control chamber is, on the one hand, higher than the default pressure and, on the other hand, lower than or equal to the second pressure of the second environment.

The detection method makes it possible to detect a leak but also to determine the origin of the leak, which facilitates maintenance.

BRIEF DESCRIPTION OF THE DRAWINGS

The invention will be better understood on reading the description that follows, given uniquely as an example and by referring to the appended drawings in which.

It should be noted that the figures present the invention in a detailed manner to implement the invention, said figures obviously being able to serve to better define the invention if need be.

DETAILED DESCRIPTION

The invention will now be described for a fuel cell in an aeronautics application.

Figure 1:
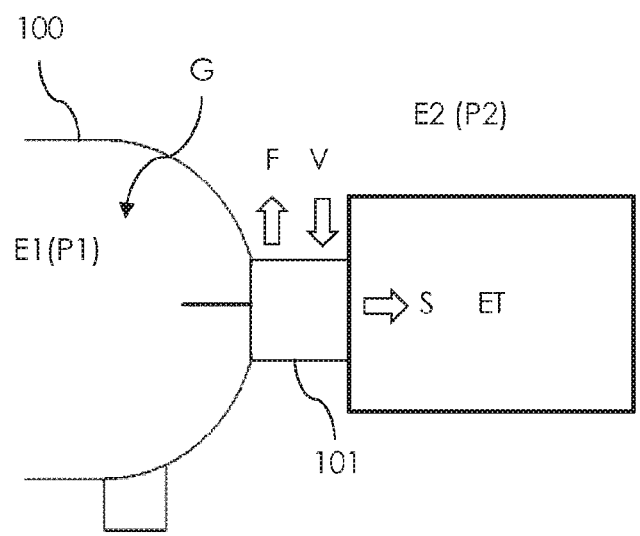
FIG. 1 is a schematic representation of an assembly according to the invention comprising a hydrogen tank associated with an expansion device.

In this example, with reference to FIG. 1, the fuel cell comprises a hydrogen gas tank 100 which is conditioned at a first gas pressure P1. The tank 100 is equipped with an expansion device 101 called "integrated cylinder valve" which comprises an expander in order to decrease the first pressure P1 during distribution. The expansion device 101 is bathed in a second environment E2 at a second pressure P2.

In this example, the second environment E2 is the ambient environment and the second pressure P2 is the ambient pressure.

The expansion device 101 is directly connected at the level of the outlet of the tank 100, which avoids resorting to pipes wherein circulates high pressure hydrogen. Indeed, the presence of pipes increases the risk of leak associated with said tubing pipes (impacts, vibrations, maintenance errors, leaks at the interfaces, etc.). In a known manner, with reference to FIG. 1, such an expansion device 101 enables a filling F, a purging V, a distribution S in a working environment ET and other. The general structure of an expansion device 101 is known to those skilled in the art and will not be described in greater detail.

Such an expansion device 101 comprises in a known manner a plurality of leak-tight connection systems between a distribution member connected to a "high pressure" environment and a receiving member, in contact with the ambient environment, in order to convey the gas G and expand it.

The invention will now be described for a connection system of an expansion device 101 but it goes without saying that the invention applies to any connection between a distribution member and a receiving member.

Figure 2:
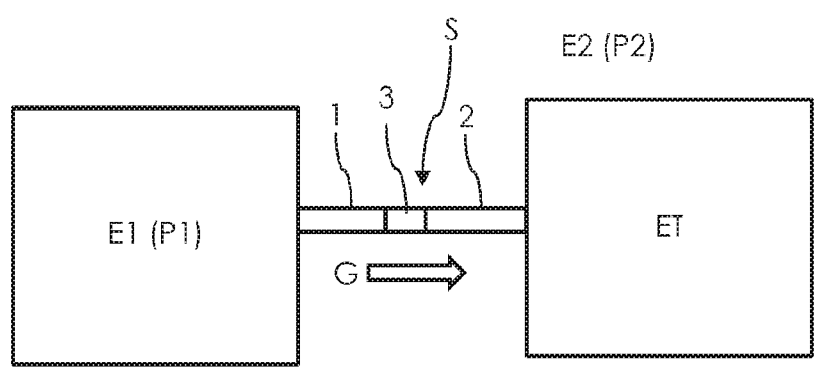
FIG. 2 is a schematic representation of a connection system between a distribution member and a receiving member according to an embodiment of the invention, the receiving member being in contact with the surrounding environment.

In a known manner, with reference to FIG. 2, a connection system S comprises a distribution member 1 fluidically connected to a first environment E1 comprising a gas G having a first pressure P1. In this example, the distribution member 1 is fluidically connected to a hydrogen environment at high pressure, that is to say at a first pressure P1 higher than 1 MPa, preferably comprised between 5 MPa and 100 MPa. The connection system S further comprises a receiving member 2 which is fluidically connected to a working environment ET wherein the gas G is used. The receiving member 2 is in contact with a second environment E2 having a second pressure P2 lower than the first pressure P1 of the gas G. As indicated previously, the second environment E2 is the ambient environment and the second pressure P2 is the ambient pressure. The distribution member 1 and the receiving member 2 are connected together at the level of an interface zone 3 represented in a functional manner in FIG. 3.

Figure 3:
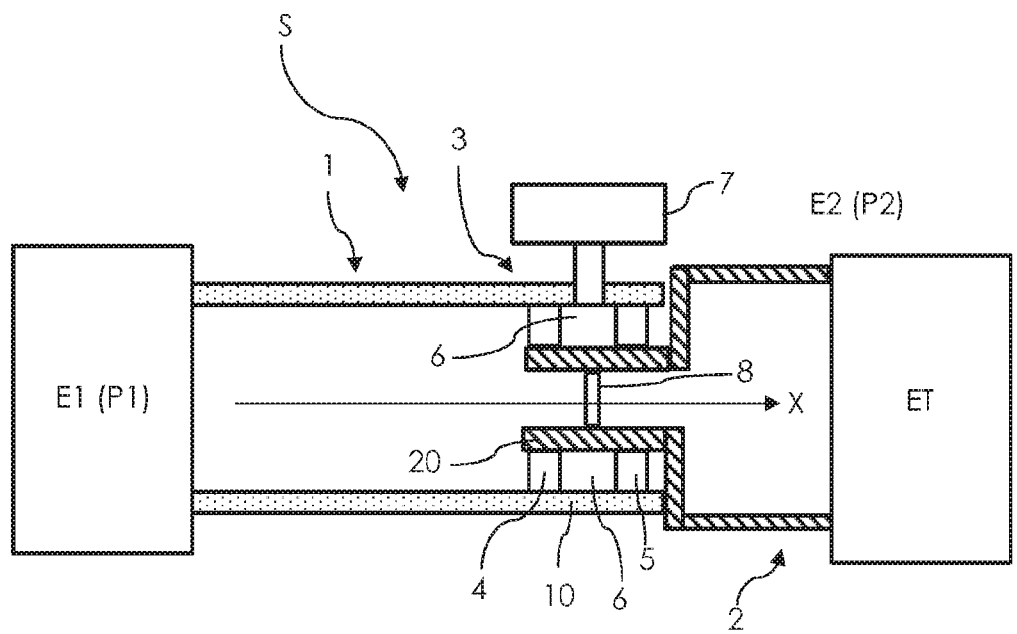
FIG. 3 is a close-up schematic representation of the interface between the distribution member and the receiving member of FIG. 2.

In this example, with reference to FIG. 3, the distribution member 1 is in the form of a tubular conduit extending axially along an axis X oriented from downstream to upstream. In this example, the receiving member 2 is in the form of a tubular conduit extending axially along an axis X oriented from upstream to downstream. The receiving member 2 is configured to be inserted partially into the distribution member 1 in order to enable a distribution of gas G from the distribution member 1 to the receiving member 2.

As illustrated in FIG. 3, the downstream end of the distribution member 1 forms first connection means 10 whereas the upstream end of the receiving member 2 forms second connection means 20. The second connection means 20 of the receiving member 2 mechanically engage with the first connection means 10 of the distribution member 1 so as to enable the distribution of gas G from the distribution member 1 to the receiving member 2. It goes without saying that the shape and the structure of the distribution member 1 and the receiving member 2 could be different as a function of the nature of the connection.

According to the invention, with reference to FIG. 3, the connection system S comprises first sealing means 4 and second sealing means 5 arranged at the interface between the first connection means 10 of the distribution member 1 and the second connection means 20 of the receiving member 2 to enable redundant leak-tight engagement between the distribution member 1 and the receiving member 2. Indeed, the "in series" arrangement of the sealing means 4, 5 enables redundancy of leak-tightness. If the first sealing means 4 are defective, leak-tightness is ensured by the second sealing means 5. Such redundancy makes it possible to limit in an important manner the risk of a leak given that the sealing means are already, as such, very reliable.

In this example, the sealing means 4, 5 are in the form of annular seals but it goes without saying that they could be of different shapes, in particular toroid or flat shaped. As illustrated in FIG. 3, the first sealing means 4 are positioned upstream of the second sealing means 5. The first sealing means 4 are in contact with the first environment E1 whereas the second sealing means 5 are in contact with the second environment E2, here the ambient environment.

The connection system S further comprises a control chamber 6 also called "inter-seal cavity", defined between the first sealing means 4 and the second sealing means 5, and means for measuring 7 the current pressure Pc in the control chamber 6. The control chamber 6 is in this example in the form of a ring but it goes without saying that its form could be different.

In this example, the means for measuring 7 the current pressure Pc are in the form of a pressure sensor but it goes without saying that it could be different, notably a mechanical measuring device.

As will be described hereafter, the default pressure Pd in the control chamber 6 is lower than the second pressure P2 of said second environment E2 (ambient pressure) so as to ensure an increase in the current pressure Pc in the control chamber 6 in the event of a leak. Indeed, the volume of the control chamber 6 is small and the current pressure Pc in the control chamber 6 tends to equal out with the pressure of the environment from where the leaks comes.

Preferably, during the connection of the distribution member 1 with the receiving member 2, the current pressure Pc in the control chamber 6 is lowered by means of a vacuum pump in order to reach the desired default pressure Pd, for example, a pressure below the ambient pressure wherein the connection system S is used.

Indeed, the control chamber 6 is leak-tight given that it is bounded by the first sealing means 4 and the second sealing means 5. Also, in normal operation, the current pressure Pc remains constant over time in the control chamber 6. In the event of degraded operation during a leak of one of the sealing means 4, 5, the measuring means 7 make it possible to detect an increase in the current pressure Pc and, furthermore, to determine the sealing means 4, 5 that are defective.

In the event of leak of the first sealing means 4, the current pressure Pc increases in the leak-tight chamber 6 given that the first environment E1 filled with gas G has a pressure higher than the default pressure Pd of the control chamber 6 (P1≥Pc>P2>Pd). The current pressure Pc measured by the measuring means 7 exceeds the second pressure P2 and comes closer to the first pressure P1, which indicates that the sealing means in contact with the first environment E1 are defective, that is to say the first sealing means 4.

In an analogous manner, in the event of a leak of the second sealing means 5, the current pressure Pc increases in the leak-tight chamber 6 given that the second environment E2 has a pressure higher than the default pressure Pd of the control chamber 6 (P1>P2≥Pc>Pd). The current pressure Pc measured by the measuring means 7 comes closer to the second pressure P2, which indicates that the sealing means in contact with the second environment E2 are defective, that is to say the second sealing means 5. Thanks to the invention, the origin of the leak may be detected in a preventive manner in order to carry out a maintenance step.

According to an aspect, with reference to FIG. 3, the receiving member 2 comprises opening means 8 making it possible to place in fluidic communication the first environment E1 with the working environment ET and thus to enable a distribution of gas G from the distribution member 1 to the receiving member 2. It goes without saying that the opening means 8 could also belong to the distribution member 1.

According to another aspect with reference to FIG. 3, the receiving member 2 is in the form of a plug of the distribution member 1 which is bathed in the second environment E2, here the ambient environment. The receiving member 2 may have for example a sensor function.

Preferably, the connection system S comprises monitoring means (not represented) configured to generate a visual, audible, computer, electric or other alarm in the event of difference of the current pressure Pc compared to the default pressure Pd. In particular, the monitoring means are configured to generate a fault alarm when the current pressure of the control chamber is higher than the default pressure Pd. The monitoring means are also configured to generate a fault alarm of the first sealing means 4 when the current pressure Pc of the control chamber 6 exceeds the second pressure P2 and comes closer to the first pressure P1. Such a connection system makes it possible not only to detect a leak but also makes it possible to determine the origin of the leak, which is very advantageous for carrying out maintenance operations.

Figure 4:
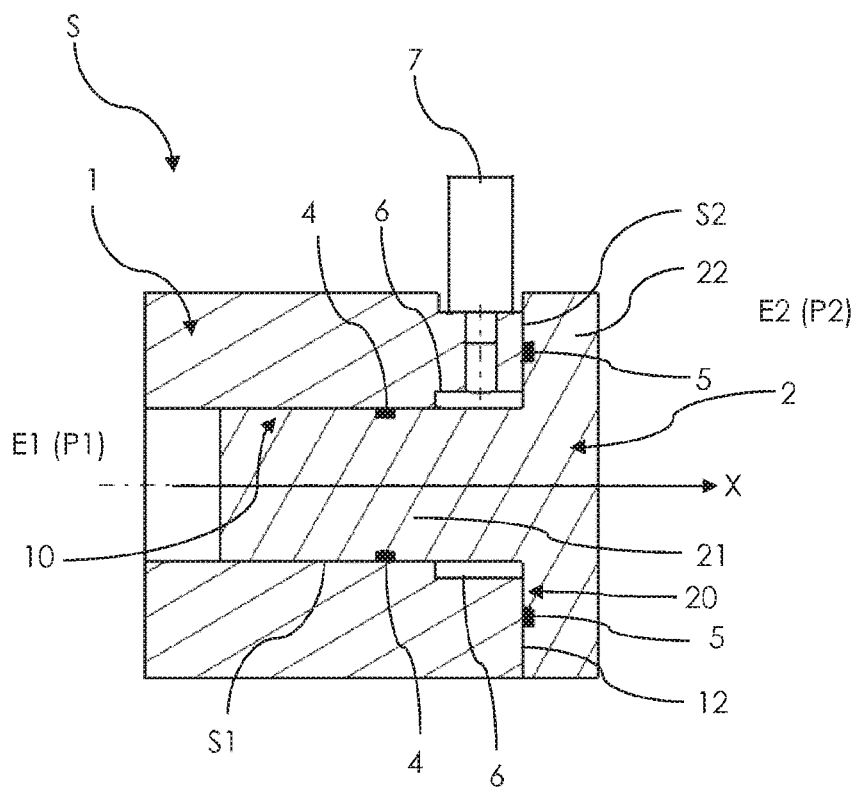
FIG. 4 is a close-up schematic representation of an exemplary structural embodiment of a distribution member and a receiving member of a connection system according to the invention.

A particular structural form of the connection system S is represented in FIG. 4. The distribution member 1 is in the form of a tubular conduit extending axially along an axis X oriented from upstream to downstream. The receiving member 2 is in the form of an insert 21 suited to being inserted along the axis X into the tubular conduit of which the distribution member 1 has the form. The receiving member 2 further comprises a base 22 extending orthogonally to the insert 21 and suited to abut against, along the axis X, the downstream end of the distribution member 1.

The receiving member 2 is in contact with the second environment E2, that is to say the ambient environment. As illustrated in FIG. 4, the connection between the distribution member 1 and the receiving member 2 defines a first upstream connection surface S1, parallel to the axis X, and a second downstream connection surface S2, orthogonal to the axis X. The first sealing means 4 and the second sealing means 5 are arranged at the interface between the first connection means 10 of the distribution member 1 and the second connection means 20 of the receiving member 2 and are respectively positioned at the level of the first upstream connection surface S1 and the second downstream connection surface S2. The control chamber 6 is in the form of a cylindrical groove which is connected to the measuring means 7. Such a connection system S has reduced bulk and enhanced reliability.

An exemplary embodiment of detection of a leak in a connection system S as described previously will now be described. During installation, the distribution member 1 and the receiving member 2 are connected in a leak-tight manner thanks to the sealing means 4, 5. The current pressure Pc of the control chamber 6 is lowered to a default pressure Pd which is lower than the first pressure P1 of the first environment E1 and the second pressure P2 of the second environment E2. In this exemplary embodiment, the default pressure Pd is equal to 1 Pa whereas the first pressure P1 is 35 MPa and the second pressure P2 is the ambient pressure equal to 0.1 MPa. It goes without saying that the ambient pressure varies in an aeronautics context. As an example, the ambient pressure may be low, in particular, of the order of 20 kPa in a non-pressurized zone of an airplane.

In the absence of leak, the measuring means 7 measure a current pressure Pc which is constant and equal to the default pressure Pd.

As indicated previously, in the event of a leak of the first sealing means 4, the current pressure Pc increases in the leak-tight chamber 6. The gas G begins to fill progressively the control chamber 6. The current pressure Pc measured by the measuring means 7 increases to exceed the value of the second pressure P2 (ambient pressure) and to come closer to the value of the first pressure P1, which indicates that the first sealing means 4 are defective. An alarm is then generated in order to warn operators that maintenance is necessary. Advantageously, through knowledge of the value of the current pressure Pc, operators can determine which seal means are to be replaced.

The presence of second sealing means 5 enables redundancy of the first sealing means 4 and makes it possible to confine the gas G in the control chamber 6. Also, there is no risk of creating an explosive atmosphere, the leak being advantageously contained. The reliability of the connection system S is increased in a significant manner, which limits the risk relating to safety and makes the use of a fuel cell in an aircraft possible. A similar detection is carried out in the event of fault of the second sealing means 5. In this case, the current pressure Pc is higher than the default pressure Pd but lower than or equal to the second pressure P2 (ambient pressure).

Figure 5:
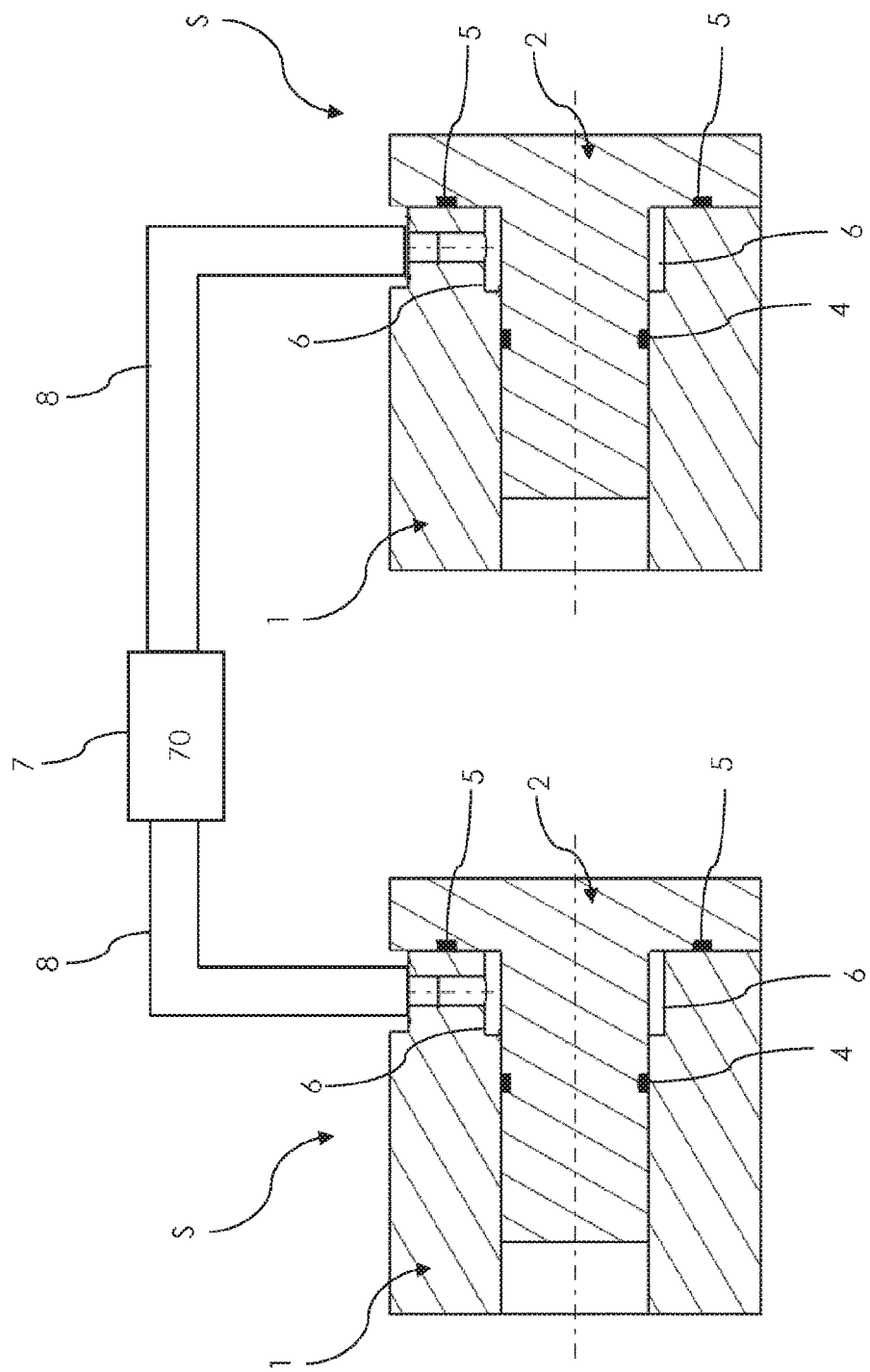
FIG. 5 is a schematic representation of a shared leak detection on several connection systems.

Advantageously, with reference to FIG. 5, the measuring means 7 are shared between several connection systems S. Thus, the control chambers 6 of the connection systems S are fluidically connected together, for example by means of pipes 8 in order to form an overall control chamber to which are connected the measuring means 7. Such sharing makes it possible to avoid the use of multiple measuring means 7. Also, preferably a single measuring device 70 is used to monitor the current pressure Pc in the overall control chamber. Such an embodiment makes it possible to limit the bulk and the cost. This is particularly advantageous for a fuel cell and/or an expansion device comprising a plurality of connection systems S close to each other.

The invention has been described for a fuel cell in an aeronautics application but it goes without saying that the invention also applies in other fields, in particular the field of land, sea or railway transport. Similarly, the invention applies to any connection of a "high pressure" distribution member to a receiving member in contact with an environment having a lower pressure.

The invention claimed is:

1. A method for detecting a leak in a connection system comprising:
   a distribution member fluidically connected to a first environment comprising a gas having a first pressure, the distribution member comprising a first connection means;
   a receiving member in contact with a second environment having a second pressure lower than the first pressure, the receiving member comprising a second connection means mechanically engaging the first connection means of the distribution member;
   a first sealing means and a second sealing means arranged at an interface between the first connection means of the distribution member and the second connection means of the receiving member to enable redundant leak-tight engagement between the distribution member and the receiving member, the first sealing means being in contact with the first environment;
   a control chamber defined between the first sealing means and the second sealing means having a default pressure that is lower than the second pressure of said second environment;
   a measuring device for measuring a current pressure in the control chamber to detect a gas leak; and
   a monitoring means;
   the method comprising:
      measuring the current pressure of the control chamber; and
      generating a fault alarm indicative of the first sealing means leaking if the current pressure in the control chamber is higher than the second pressure of the second environment, wherein sealing between the control chamber and the second environment is maintained by the second sealing means.

2. The method according to claim 1, wherein the gas is hydrogen.

3. The method according to claim 1, wherein the connection system is a first connection system in an assembly comprising a plurality of connection systems, each connection system of the plurality of connection systems comprising a control chamber, and the control chambers of at least two of the plurality of connection systems are fluidically connected together to form an overall control chamber.

4. The method according to claim 3, where the measuring device is connected to the overall control chamber.

5. The method according to claim 1, wherein the connection system connects a gas tank to a mechanical device.

6. The method according to claim 1, wherein the connection system connects a hydrogen tank to a mechanical device of a fuel cell.

7. The method according to claim 1, wherein the connection system connects a hydrogen tank to a mechanical device of a fuel cell in an aircraft.

8. The method according to claim 1, wherein the receiving member comprises a base abutted against the first connection means of the distribution member.

9. A method for detecting a leak in a connection system comprising:
   a distribution member fluidically connected to a first environment comprising a gas having a first pressure, the distribution member comprising a first connection end;
   a receiving member exposed to a second environment having a second pressure lower than the first pressure, the receiving member comprising a second connection end mechanically engaging with the first connection end of the distribution member;
   a first sealing member having an annular body and a second sealing member having an annular body arranged at an interface between the first connection end of the distribution member and the second connection end of the receiving member in a spaced apart manner to enable redundant leak-tight engagement between the distribution member and the receiving member, the first sealing member being exposed to the first environment;
   a control chamber defined between the first sealing member and the second sealing member, the first control chamber having a default pressure that is lower than the second pressure of said second environment;
   a pressure measuring device for measuring a current pressure in the control chamber, said current pressure having a pressure value indicative of (1) a first gas leak condition at the first sealing member wherein said pressure value is higher than said second pressure and greater than said default pressure, and (2) a second gas leak condition at the second sealing member wherein said pressure value is equal to or less than said second pressure and greater than said default pressure; and a monitoring mechanism wired to emit a fault alarm when a leak is detected;

the method comprising:

measuring the current pressure of the control chamber with the pressure measuring device; and generating a fault alarm with the monitoring mechanism when said pressure measuring device measures the pressure value corresponding to the first gas leak condition or the second gas leak condition.

10. The method according to claim 9, wherein the current pressure in the control chamber is constant over time during normal operations.

11. The method according to claim 9, wherein the receiving member comprises an opening for gas flow from the distribution member to the receiving member.

12. The method according to claim 11, wherein the receiving member further comprises a base abutted against the first connection end of the distribution member.

13. The method according to claim 12, wherein the second sealing member is in contact with the base of the receiving member.

14. The method according to claim 9, wherein the gas is hydrogen.

15. A method for detecting a leak in a connection system comprising:

a distribution member fluidically connected to a first environment comprising a gas having a first pressure, the distribution member comprising a body with a bore;

a receiving member in contact with a second environment having a second pressure lower than the first pressure, the receiving member comprising a body mechanically engaging the body of the distribution member;

a first sealing member having an annular body and a second sealing member having an annular body arranged at an interface between the body of the distribution member and the body of the receiving member in a spaced apart manner and defining a control chamber therebetween, the first sealing member being exposed to said first pressure and sealing between the control chamber and the second environment is maintained by the second sealing member;

a measuring device in fluid communication with the control chamber for measuring a current pressure in the control chamber; and a monitoring mechanism wired to emit a fault signal when a leak is detected;

the method comprising:

measuring the current pressure of the control chamber;

comparing the current pressure to the first pressure, the second pressure, and a default pressure; and generating a fault signal with the monitoring mechanism when the current pressure in the control chamber is (1) higher than the second pressure to indicate leakage at the first sealing member or (2) less than or equal to the second pressure to indicate leakage at the second sealing member.

16. The method according to claim 15, wherein the measuring device comprises a pressure sensor.

17. The method according to claim 15, wherein the receiving member comprises an opening for gas flow between the receiving member and the distribution member.

18. The method according to claim 15, wherein the receiving member comprises a base abutted against the body of the distribution member.

19. The method according to claim 18, wherein the second sealing member is sealed against the base of the receiving member.

20. The method according to claim 15, wherein the gas is hydrogen.

* * * * *